United States Patent [19]

Seyferth et al.

[11] Patent Number: 5,070,116

[45] Date of Patent: Dec. 3, 1991

[54] PRECERAMIC ORGANOSILICON-METAL CARBONYL POLYMERS

[75] Inventors: Dietmar Seyferth, Lexington; Christine A. Sobon, Watertown, both of Mass.; Jutta Borm, Bruchkoebel-Rossdorf, Fed. Rep. of Germany

[73] Assignee: Massachusetts Institute of Technology, Cambridge, Mass.

[21] Appl. No.: 652,468

[22] Filed: Feb. 7, 1991

Related U.S. Application Data

[63] Continuation of Ser. No. 360,846, Jun. 2, 1989, abandoned.

[51] Int. Cl.$^5$ .............................................. C08F 2/46
[52] U.S. Cl. ................................... 523/22; 522/29; 522/148; 522/178; 522/475; 522/28; 522/38
[58] Field of Search ............... 525/475; 522/22, 29, 522/148, 178; 528/28, 38

[56] References Cited

U.S. PATENT DOCUMENTS

| | | | |
|---|---|---|---|
| 3,108,985 | 10/1963 | Weyer | 260/37 |
| 3,853,567 | 12/1974 | Verbeek | 106/44 |
| 3,892,583 | 7/1975 | Winter et al. | 106/55 |
| 4,310,651 | 1/1982 | Baney et al. | 528/21 |
| 4,312,970 | 1/1982 | Gaul, Jr. | 526/279 |
| 4,404,153 | 9/1983 | Gaul, Jr. | 264/29.2 |
| 4,482,669 | 11/1984 | Seyferth et al. | 524/442 |
| 4,611,035 | 9/1986 | Brown-Wensley et al. | 525/474 |
| 4,639,501 | 1/1987 | Seyferth et al. | 528/15 |
| 4,645,807 | 2/1987 | Seyferth et al. | 525/474 |
| 4,650,837 | 3/1987 | Seyferth et al. | 525/478 |
| 4,705,837 | 11/1987 | Seyferth et al. | 528/31 |
| 4,719,273 | 1/1988 | Seyferth et al. | 528/15 |
| 4,720,532 | 1/1988 | Seyferth et al. | 528/28 |
| 4,762,895 | 8/1988 | Chandra et al. | 525/477 |
| 4,767,876 | 8/1988 | Seyferth et al. | 556/410 |
| 4,780,337 | 10/1988 | Seyferth et al. | 528/15 |
| 4,820,783 | 4/1989 | Seyferth et al. | 525/474 |

OTHER PUBLICATIONS

R. W. Rice, Amer. Ceram. Soc. Bull 62:889-892 (1983).
Penn et al., J. Appl. Polymer Sci, 27:3751-61 (1982).

*Primary Examiner*—Paul R. Michl
*Assistant Examiner*—Karen A. Hellender
*Attorney, Agent, or Firm*—George W. Neuner; Ronald I. Eisenstein

[57] ABSTRACT

Organosilicon-metal polymers are prepared by mixing an organosilicon polymer containing a multiplicity of Si-H and/or Si-Si functional groups with a sufficient quantity of a metal carbonyl for the metal carbonyl to be incorporated into the organosilicon polymer. These polymers can be used to prepare ceramics.

12 Claims, No Drawings

PRECERAMIC ORGANOSILICON-METAL CARBONYL POLYMERS

This invention was made with Government Support under grant numbers AFOSR-85-0265 and AFOSR-89-0040 awarded by the Air Force. The Government has certain rights in this invention.

This is a continuation of copending Application Ser. No. 07/360,846 filed on June 2, 1989, now abandoned.

The present invention relates to a novel preceramic polymer formed by reacting organosilicon polymers containing Si—H or Si—Si functional groups with metal carbonyls.

In recent years there has been a great deal of interest in, preceramic polymeric materials which can serve as precursors, via their pyrolysis, for silicon-containing ceramics. R. W. Rice, *Amer. Ceram. Soc. Bull.* 62:889–892 (1983). Uses for such polymers include among others: formation into complex shapes and subsequent pyrolysis to give a ceramic material of the same shape; spinning into continuous fibers whose subsequent pyrolysis yields ceramic fibers; as a matrix material for carbon or ceramic fibers, or as a binder for ceramic powders (with subsequent pyrolysis to form a ceramic body); oxidation-resistant coatings on otherwise oxidizable materials (such as carbon-carbon composites), after the polymer coating is made it can be pyrolyzed to give the resistant ceramic coating; infiltration of porous ceramic bodies such as ones obtained from reaction-sintered silicon nitride by the polymer itself (if liquid) or by a solution of the polymer with subsequent pyrolysis to form a ceramic resulting in better strength oxidation resistance, etc. of the body, and formation of thin films of ceramic material for electronics applications. For example, Penn, et al., *J. Appl. Polymer Sci.*, 27:3751-61 (1982) describes the preparation of silicon carbide-silicon nitride fibers for a polycarbosilazane precursor. Other polymer precursors for forming silicon carbide and silicon nitride ceramics have been described in U.S. Pat. Nos. 3,108,985; 3,853,567; 3,892,583; 4,310,651, 4,312,970, 4,404,153 and 4,611,035. These linear or cross-linked polymers and processes for producing ceramic materials have generally been found to be deficient in one or more ways. For example, if the preceramic polymer is to be used in the fabrication of ceramic fibers or ceramic coatings or as binders for ceramic powders or as matrices and ceramic composites they should be fusible and/or soluble in organic solvent. For the preparation of shaped ceramic bodies or ceramic powders, the material need not be soluble or fusible. However, whatever the application may be, their pyrolysis should result in the evolution of as small an amount of volatiles as possible and leave behind a ceramic residue in as high a yield as possible.

Seyferth et al., in U.S. Pat. Nos. 4,650,837, 4,645,807, 4,639,501, 4,780,337, 4,767,876, 4,720,532, 4,705,837, 4,719,273, 4,820,783, and 4,482,669 have disclosed new polymers whose pyrolysis results in good ceramic yields. However, there are many other organosilicon polymers that one might hope would be useful as preceramic materials, but whose pyrolysis does not result in the evolution of as small amounts of volatiles as possible. With other organosilicon polymers, the ceramic yields, while in an acceptable range, i.e., between about 40–70%, do not produce a ceramic yield as high as would be desirable, for example, 75–90%.

It would be desirable to have a wide range of useful preceramic polymers and/or preceramic polymers whose ceramic yield is increased over that of the starting organosilicon polymer. It would be useful to have a polymer precursor that when pyrolyzed will give, after crystallization, a ceramic blend whose ceramic composition will also have the advantages of metals. For example, increased fracture toughness or strength compared with the pure components.

SUMMARY OF THE INVENTION

We have now discovered an organosilicon-metal polymer prepared by reacting an organosilicon polymer having a plurality of Si—H or Si—Si functional groups with a sufficient quantity of a metal carbonyl to be incorporated into the organosilicon polymer and initiating the incorporation reaction. The organosilicon polymer is preferably an organic polysilane having a plurality of Si—H or Si—Si functional groups and is more preferably:

(a) an organopolysilane having a plurality of repeat units of the formula:

$$[(RSiH)_x(RSi)_y]_n \qquad (I);$$

(b) a polycarbosilane having a plurality of repeat units of the formula $$[RSi(H)(A)_q]_n \qquad (II);$$

(c) a polysiloxane having a plurality of repeat units of the formula $$[RSi(H)(O)]_n \qquad (III);$$

(d) or a polysilane having a plurality of repeat units of the formula $$[RR^1Si]_n \qquad (IV); \text{ and}$$

mixtures thereof, where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms. A is R, a difunctional alkylene, alkenylene or alkynylene, or a heteroatom substituted R, $R^1$ is R or A, q is 1 or greater, $x+y=1$ and n is an integer greater than 1.

The metal carbonyl preferably includes those of the metals Fe, Co, Ni, Ru, Os, Rh, Ir, Pd, Pt, Ti, Zr, Hf, V, Nb, Ta, Cr, Mo and W. The metal carbonyl can be incorporated into the Si—H and/or Si—Si organosilicon polymer by a variety of means well known to the skilled artisan, such as UV irradiation or by some other form of energy input such as heat or gamma irradiation. Preferably, the sufficient quantity of metal carbonyl used is at least about 0.25 weight percent. The use of such amounts will typically increase the yield upon pyrolysis of the resultant organosilicon-metal preceramic polymer over that of the starting organosilicon polymer.

DETAILED DESCRIPTION OF INVENTION

We have now discovered new preceramic polymers whose ceramic yield upon pyrolysis is typically greater that that of the organosilicon polymer precursor. This hybrid polymer is formed by reacting an Si—H or Si—Si containing organosilicon polymer with a sufficient quantity of a metal carbonyl to have the metal carbonyl incorporated into the organosilicon polymer to form an organosilicon-metal polymer.

The Si—H or Si—Si containing organosilicon polymer preferably contains a plurality of Si—H or Si—Si functional groups. More preferably the organosilicon polymer is:

(a) an organopolysilane having a plurality of repeat units of the formula:

$$[(RSiH)_x(RSi)_y]_n \quad (I);$$

(b) a polycarbosilane having a plurality of repeat units of the formula $$[RSi(H)(A)_q]_n \quad (II);$$

(c) a polysiloxane having a plurality of repeat units of the formula $$[RSi(H)(O)]_n \quad (III);$$

(d) a polysilane having a plurality of repeat units of the formula $$[RR^1Si]_n \quad (IV);$$

or mixtures thereof,
where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms. A is R, a difunctional alkylene alkenylene or alkynylene or a heteroatom substituted R (e.g., O, N, S, Si, etc.), $R^1$ is R or A, q is 1 or greater, $x+y=1$ and n is an integer greater than 1.

For example, the polycarbosilane of the formula $[RSi(H)(A)_q]_n$ can include repeat units such as $[RSi(H)(CH_2)]$, $[RSi(H)(C=C)]$, $[RSi(H)(N-R)]$, $[RSi(H)],[RSi(H)(CH=CH)]$,

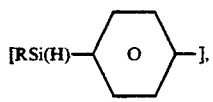

$[RSi(H)(CH_2)_q]$, etc. The organopolysilane also includes polysilazanes having a plurality of repeat units of the formula $[(RSiHNH)_a(RSiN)_b]_n$, where $a+b=1$.

Additionally, the Si—H and Si—Si containing organosilicon polymer can include polymers having a plurality of the repeat units of the formulae $[RSi(H)(S)]$, $[RSi(H)(N)H]$, $[RSi(H)(B)—A—(D)]$, where R and A are the same as defined above, $B=D=O$, $B=D=NH$, NR and $B=O$ and $D=NH$.

These repeat units may constitute only a portion of the organosilicon polymer structure. For instance, the Nippon Carbon Company Nicalon precursor contains the polycarbosilane repeat unit $[CH_3(H)SiCH_2]$ as an important component, but other groups, e.g., $—(CH_3)_2SiCH_2—$ are also present. Typically, in a Seyferth polysilazane precursor for silicon carbonitride and silicon nitride, $[(CH_3SiHNH)_a(CH_3SiN)_b]_n$, less than 50% of the silicon atoms carry a hydrogen substituent. Nevertheless, the chemistry of the Nicalon polycarbosilane (Nicalon PSC) and the Seyferth polysilazane are in large part dominated by the chemistry of the Si—H bonds that they contain.

Although some reactions of non-polymeric organosilicon hydrides with transition metal complexes give products in which the silicon atom was bonded to the transition metal or occasionally to an organic ligand on the transition metal were reported [Advances in Inorganic Chemistry and Radiochemistry, vol. 25, pp. 12-31, 120-133 (Acad. Press Inc., N.Y.) (1982)], we are unaware of any report that suggests that the incorporation of a metal carbonyl into organosilicon polymers would result in an organosilicon-metal polymer having an increased ceramic yield when compared to that of the starting organosilicon polymer.

We have found transition metal carbonyl derivatives to be preferable in the reactions with the organosilicon polymers containing Si—H and/or Si—Si functional groups described herein. Preferably the metals are Fe, Co, Ni, Ru, Os, Rh, Ir, Pd, Pt, Ti, Zr, Hf, V, Nb, Ta, Cr, Mo and W. The particular application for which the resultant organosilicon-metal preceramic polymer is to be used would affect the metal carbonyls selected. For example, although not always, complexes containing metals such as Fe, Co, Ni and the early transition metals (Ti, Zr, Hf, V, Nb, Ta, Cr, Mo, and W) can be used in large amounts since carbides and nitrides of these elements as well as the metals themselves have exceptionally favorable properties and their use would give useful ceramic blends. One would typically employ complexes of the expensive group VIII metals (Ru, Os, Rh, Ir, Pd and Pt) as well as Fe, Co or Ni) in small amounts to achieve desired cross-linking of the Si—H and/or Si—Si organosilicon polymers to improve the ceramic yield. Metal carbonyls that either lose a CO ligand or, if di or polynuclear, undergo metal-metal bond scission upon input of energy such as UV irradiation are particularly useful. Preferable candidates are:

1. All neutral, binary metal carbonyls, either mono-, di- or polynuclear.
2. Cationic and anionic metal carbonyl species related to those in category (1).
3. Mono-, di- and polynuclear metal carbonyls that contain one or more σ- or π-bonded organic ligands including, but not limited to, the following:
   σ-alkyl, alkenyl, aryl, alkynyl
   π-olefin, acetylene, arene, polyene, allyl, cyclopentadienyl
   carbene and carbyne ($\mu^1$, $\mu^2$ or $\mu^3$ types)
4. Mono-, di- and polynuclear metal carbonyls that contain a lone pair donor ligand such as $R_3P$, $R_3As$, $R_2S$, $R_2Se$, RNC, NO, etc.

Among the binary metal carbonyls mentioned are the following: $V(CO)_6$, $Cr(CO)_6$, $Mo(CO)_6$, $W(CO)_6$, $Mn_2(CO)_{10}$, $Re_2(CO)_{10}$, $Fe(CO)_5$, $Fe_2(CO)_9$, $Fe_3(CO)_{12}$, $Os(CO)_5$, $Os_2(CO)_9$, $Os_3(CO)_{12}$, $Ru(CO)_5$, $Ru_2(CO)_9$, $Ru_3(CO)_{12}$, $Co_2(CO)_8$, $Co_4(CO)_{12}$, $Rh_2(CO)_8$, $Rh_4(CO)_{12}$, $Rh_6(CO)_{16}$, $Ir_2(CO)_8$, $Ir_4(CO)_{12}$, $Ni(CO)_4$.

$Ru_3(CO)_{12}$, $Fe_3(CO)_{12}$, $Co_2(CO)_8$ and $Rh_6(CO)_{16}$ are preferred.

Also included are the many possible organotransition metal complexes in which the complex contains not only carbon monoxide ligands but also organic groups wither σ- or π-bonded to the metal. A few of the many possibilities are listed below.

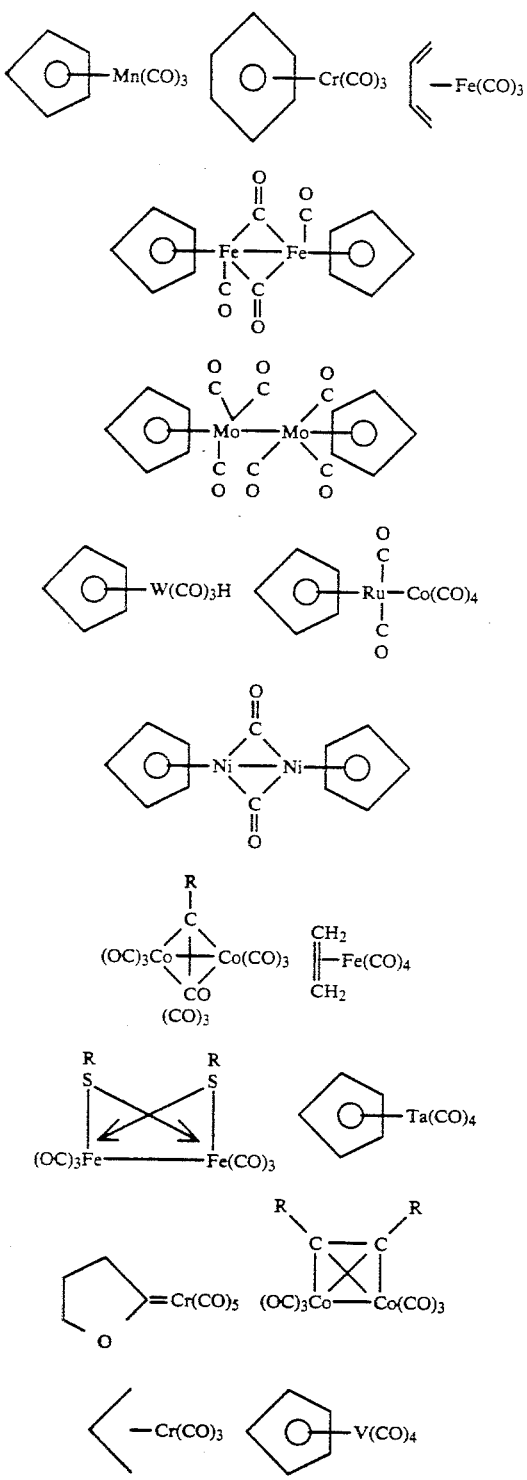

The preceramic organosilicon metal polymer is prepared by mixing an organosilicon polymer containing a multiplicity of Si—H and/or Si—Si functional groups with a sufficient quantity of a metal carbonyl to be incorporated into the organosilicon polymer and allowing the mixture to react, thereby forming the organosilicon metal polymer.

The incorporation reaction can be initiated by any variety of means well known to the skilled artisan. Preferably, the reaction is initiated by UV irradiation or by means of some other energy input such as heat or gamma irradiation. UV irradiation is preferred. In addition, one can use a free radical initiator as a catalyst. The free radical initiator is either a peroxide, more preferably an organic peroxide or an azo compound, preferably, azobisisobutyronitrile and the like. These free radical catalysts are well known in the art.

The reaction is preferably carried out in solution but it can also be carried out in the solid state using an intimate mixture of the organosilicon polymer and the metal carbonyl.

In a solution, one can use any organic solvent in which each material is soluble. These solvents are well known to the person of ordinary skill in the art and include toluene, tetrahydrofuran (THF), benzene, hexane, etc. . . . The addition of very small amounts of the metal carbonyl will result in a preceramic polymer that, upon pyrolysis, will typically give a higher ceramic yield than the organosilicon precursor. The amount of metal carbonyl can be as small as about 0.25 weight percent. Preferably, the amount used is about 1.0 weight percent, more preferably 2-5 weight percent. For example, Table 1 indicates the reaction between the metal carbonyl, $Ru_3(CO)_{12}$ and Nicalon polycarbosilane. This organosilicon polymer is the precursor for Nicalon ceramic fibers and contains a multiplicity of —$CH_3(H)SiCH_2$— units. Its pyrolysis in the uncured state gives a ceramic yield in the 55-60% range and a ceramic residue of SiC and a rather large amount of free carbon. When hexane solutions of Nicalon polycarbosilane containing varying amounts of $Ru_3(CO)_{12}$ were irradiated with an ultraviolet (UV) source, a new polymer resulted whose pyrolysis (to 1000° C. in a stream of argon) gave substantially higher ceramic yields. For a given irradiation time (4 hours) the ceramic yield obtained on pyrolysis of the new polymer was a function of the amount of the metal carbonyl used. Although thermal activation of the metal carbonyl organosilicon reaction also was effective, an untreated physical mixture was not. Thus, 2 weight percent of $Ru_3(CO)_{12}$ added to the Nicalon organosilicon polymer in refluxing benzene (ca. 80° C.) produced a polymer whose ceramic yield on pyrolysis was 84%. Weight percent of the metal carbonyl used is based upon the weight of the organosilicon polymer used. The thermogravimetric analysis (TGA) trace of an untreated physical mixture of the same Nicalon polymer and 2 weight percent $Ru_3(CO)_{12}$ to 950° C. at 10° C. per minute in a stream of argon, resulted in a ceramic yield of 57%, which is no increase over the yield of the Nicalon polymer alone.

Similar results were obtained with other metal carbonyls. See Table 2. Here also the ceramic yield obtained on pyrolysis of the resulting polymer depended on the weight % of the metal carbonyl used.

TABLE 1

Pyrolysis of Polymers Obtained by UV Irradiation of Hexane Solutions of Nicalon PCS and x Weight % of $Ru_3(CO)_{12}$ for 4 Hours

| $Ru_3(CO)_{12}$, Wt %, based on Nicalon PCS | Ceramic Yield (by TGA) |
|---|---|
| 10 | 93 |
| 2 | 87 |
| 1 | 81 |
| 0.5 | 74 |
| 0.25 | 69 |

TABLE 2

Reactions of Nicalon PCS with Metal Carbonyls and TGA Ceramic Yields of the Resulting New Polymers

| Metal Carbonyl[a] | Ceramic Yield (%) |
|---|---|
| A. UV-Induced Reactions (in hexane for 4 hours) | |
| $Co_2(CO)_8$ | 87 |
| $Co_4(CO)_{12}$ | 83 |
| $Rh_6(CO)_{16}$ | 90 |
| $Os_3(CO)_{12}$ | 83 |
| $Ir_4(CO)_{12}$ | 62 |
| $Fe(CO)_5$ | 75 |
| $Fe_3(CO)_{12}$ | 83 |
| B. Thermally Induced Reactions (in hexane at 70° C. for 4 hours) | |
| $Co_2(CO)_8$ | 86 |
| $Co_4(CO)_{12}$ | 82 |
| $Rh_6(CO)_{16}$ | 89 |
| $Os_3(CO)_{12}$ | 63 |
| $Ir_4(CO)_{12}$ | 57 |
| $Fe(CO)_5$ | 65 |
| $Fe_3(CO)_{12}$ | 71 |

[a]0.03 mmol of metal carbonyl, regardless of nuclearity, per 1.0 g of Nicalon PCS.

Thus, we have found it preferable that at least about 2-5 weight percent of the metal carbonyl is used to produce the resultant organosilicon-metal polymer.

For example, with the organosilicon polymer of the formula $[(CH_3SiH)_x(CH_3Si)_y]_n$ obtained by the action of sodium on $CH_3SiHCl_2$ (x+y=1); x~0.6–0.8, liquid product; x~0.5 or less, solid product) pyrolysis (to 1000° C. in a stream of argon) of the liquid polysilane gives a low ceramic yield of SiC plus a substantial amount of free silicon (ca 1 SiC+0.5 Si) (12–20% by TGA). The solid polysilane is more highly cross linked and gives a higher (50–60%) ceramic yield on pyrolysis to 1000° C. These ceramic yields also are improved by appropriate treatment of these polysilanes with a metal carbonyl (Table 3). The improvement is not as great in absolute terms as in the case of the Nicalon polycarbosilane, but the resultant organosilicon-metal polymer has a higher ceramic yield under pyrolysis in an inert atmosphere than does the liquid or solid polysilane precursor.

TABLE 3

Pyrolysis of the $[(CH_3SiH)_x(CH_3Si)_y]_n$ Polysilanes, Untreated and After UV Irradiation with 2 Wt % $Ru_3(CO)_{12}$

| Polysilane | Treatment (Solvent) | Ceramic Yield (by TGA %) |
|---|---|---|
| Liquid Polysilane | none (hexane) | 12 |
| Liquid Polysilane | $Ru_3(CO)_{12}$ (hexane) | 55 |
| Solid Polysilane | none (THF) | 52 |
| Solid Polysilane | $Ru_3(CO)_{12}$ (THF) | 73 |

Similarly, the ammonolysis product of $CH_3SiHCl_2$, $(CH_3SiHNH)_n$, a mixture of mostly cyclic oligomers ($n_{av}$~5) gives, on pyrolysis to 1000° C. in a stream of argon, a ceramic yield of about 20%. The organosilicon-metal polymer formed by irradiation of a benzene solution of the $(CH_3SiHNH)_n$ product that contained 2 wt. % of $Ru_3(CO)_{12}$ with a UV source for 4 hours is a sticky, glue-like residue after removal of the solvent, which on pyrolysis to 1000° C. gave a ceramic yield of 83%. (Note that although at higher temperatures $Ru_3(CO)_{12}$ is claimed to catalyze a $H_2$ elimination reaction between Si—H and N—H to give cross-linking via newly formed Si—N—Si linkages (Laine et al., Synthetic Routes to Oligosilazanes and Polysilazanes Precursors to Silicon Nitride ACS Symposium Series 1988, 360, 124–42); the present reaction conditions are different and a different polymer is formed as we believe the N—H bonds are not involved). The polyhydrosiloxane, $[CH_3(H)SiO]_n$, is not a useful preceramic material, giving very low (~5%) ceramic yields when pyrolyzed to 1000° C. The organosilicon-metal polymer formed when a solution of this liquid polyhydrosiloxane (the commercial PS-122 from Petrarch Systems) and 2 wt. % of $Ru_3(CO)_{12}$ in hexane was irradiated with a UV source for 4 hours is a yellow oil. The latter was converted to an insoluble product after it had been kept under nitrogen for a day. The ceramic yield (pyrolysis to 1000° C.) of this insoluble material was 52%, an order of magnitude increase. Similar irradiation of the PS-122 siloxane and 2 wt. % of $Fe(CO)_5$ produced an insoluble brown gel which had a ceramic yield of 93% when pyrolyzed. Similarly, irradiation of the PS-122 siloxane and 2 wt. % of $Rh_6(CO)_{16}$ produced a black, rubbery, insoluble material which had a ceramic yield of 83% when pyrolyzed.

In general, because of their expense, one would only wish to use small amounts of the expensive group VIII metal carbonyls.

One can use larger amounts of the metal carbonyls to obtain the novel organosilicon-metal polymers. When such larger amounts are used, not only is the ceramic yield upon pyrolysis of the resultant organosilicon metal polymer increased when compared to that of the organosilicon polymer, but the resultant ceramic will be a ceramic blend involving silicon and a metal component (as the metal carbide, metal nitride or the free metal) in substantial amount. There is increasing evidence that ceramic blends, e.g., SiC/TiC, AlN/SiC, $SiC/Si_3N_4$, etc. can have advantageous properties. For example, these ceramic blends can have increased fracture toughness or strength compared with the pure components. Thus, the resultant ceramic produced, when large amounts of a metal carbonyl are incorporated into organosilicon polymer can have certain advantageous criteria in certain applications. These polymers can result in better ceramic fibers and coatings and better polymer binders and matrices or can have useful electrical or thermal properties, depending upon what their use is. Indeed, more than one metal carbonyl may be used in such a reaction so that two or more metals may be incorporated into the resultant polymer. Preferably, the metals used would include Fe, Co, Ni, Ti, Zr, Hf, V, Nb, Ta, Cr, Mo and W. The weight percent of metal carbonyl used would preferably be more than 5 weight %. More preferably, more than 10 weight %. The particular weight range used can vary widely and be empirically determined by the skilled artisan based upon the present disclosure and desired application. The particular metal(s) used will depend upon what the use for the ceramic is. Such blends can be readily determined by the person of ordinary skill in the art, based upon the present disclosure.

More than one organosilicon polymer can be used in creating the organosilicon-metal polymer. In this way, one may prepare a preceramic polymer that, when the right proportions of the two polymers are used in conjunction with the metal carbonyl, will give on pyrolysis a high yield of the desired ceramic (e.g. SiC) in the correct elemental stoichiometry.

For example, the polysilane containing repeat units $[(CH_3SiH)_x(CH_3Si)_y]_n$ obtained by the reaction of sodium with $CH_3SiHCl_2$ (x+y=1; x approximately 0.6–0.8, liquid product; x approximately 0.5 or less, solid product) when pyrolyzed to 1000° C. in a stream of an inert gas, such as argon or nitrogen, gives a low ceramic yield for the liquid polysilane and also contains an excess of free silicon (ca. 1 SiC+0.5 Si) (12-20% by TGA). The solid polysilane gives a higher ceramic yield (50-60%) but also an excess of free silicon. On the other hand, pyrolysis of the uncured Nicalon polycarbosilane to 1500° C. in a stream of argon gave a ceramic residue containing an excess of free carbon (elemental analysis gave: 60-12% Si, 39.55% C, 0.03% H; which can be translated into a composition of 1SiC+0.54C). Such excesses of free carbon and silicon are undesirable. An appropriate mixture of the Nicalon polycarbosilane and the liquid or solid polysilane, when UV irradiated in hexane or THF solution with 2 weight percent of a metal carbonyl, produces an organosilicon-metal polymer which has a better ceramic yield than the starting organosilicon materials and whose analysis is very close to that of stoichiometric SiC. See Table 4. In this instance, one would wish to use only a small amount (e.g., 2 weight percent) of the metal carbonyl so that one obtained a high yield of the SiC. However, this will vary, depending upon the situation and the desired ceramic or ceramic blend. Other mixtures can readily be used. For example, another organosilicon polymer whose pyrolysis gives an excess of free carbon in addition to the desired SiC is the Union Carbide vinyl polysilane (ViPS) obtained by the sodium condensation of appropriate quantities of $Me_3SiCl$, $MeSiHCl_2$ and $Me(CH_2=CH)SiCl_2$. Again, UV irradiation of a mixture (2 to 1 by weight) of the liquid polysilane of the formula $[(CH_3SiH)_x(CH_3Si)_y]_n$ and the ViPS with 2 weight percent of $Ru_3(CO)_{12}$ in hexane for 4 hours gave a new polymer whose pyrolysis to 1000° C. in a stream of argon gave better than 98% pure SiC.

TABLE 4

| Pyrolysis of Hybrid Polymers Made Using Solid and Liquid $[(CH_3SiH)_x(CH_3Si)_y]_n$ Polysilane | | | |
|---|---|---|---|
| Hybrid System (2:1 wt. ratio) | 2 wt % $Ru_3(CO)_{12}$ in | Ceramic Comp. (by analysis) | Si/C Ratio |
| solid PS/Nicalon PCS | THF (4 hr. UV) | 1.0 SiC + 0.01 C (= 99.7% SiC) | 0.99 |
| liquid PS/Nicalon PCS | hexane (4 hr. UV) | 1.0 SiC + 0.04 C (= 98.9% SiC) | 0.96 |
| liquid PS/ViPS | hexane (4 hr. UV) | 1.00 SiC + 0.05 C (= 98.4% SiC) | 0.95 |

The reaction between the metal carbonyl and the organosilicon polymer containing a multiplicity of Si—H and/or Si—Si functional groups can be carried out prior to any applications processing in order to obtain the preceramic polymers described herein or they can be carried out in situ as part of the applications processing. Thus, a coating material could be prepared using a mixture of a Si—H or Si—Si containing polymer and the metal carbonyl. This mixture, either neat or in solution could be used to coat the substrate. Subsequent initiation of the incorporation reaction, either by photolysis, another form of radiation treatment, heating, etc. would result in a coating of the organosilicon-metal polymer. This coating would result in a ceramic coating in high yield upon pyrolysis. Similarly, polymer fibers containing the metal carbonyl can be incorporated into the organosilicon polymer containing the multiplicity of Si—H and/or Si—Si functional groups in a like manner to produce fibers of a new organosilicon-metal polymer, which when pyrolyzed will produce ceramic fibers in high yields. When used in this method, we will sometimes refer to the reaction of the metal carbonyl with the organosilicon polymer as a cure step, rather than as part of the preparative procedure.

Although not wishing to be bound by theory, there is substantial indirect evidence pointing to the chemical transformations which occur when the organosilicon polymer and the metal carbonyl are irradiated or heated. For example, the Nicalon polycarbosilane contains a multiplicity of Si—H bonds, as well as some Si—Si bonds. The $[(CH_3SiH)_x (CH_3Si)_y]_n$ polysilane contains a multiplicity of Si—H bonds and its backbone is composed entirely of Si—Si bonds. The loss of Si—H bonds in the incorporation reaction in both polymers is demonstrated by the integrated proton NMR spectrum. The proton NMR spectrum of a hexane solution of Nicalon polycarbosilane containing 2 weight percent $Ru_3(CO)_{12}$ prior to any incorporation reaction showed the SiC—H and Si—H protons to be present in a ratio of 11.3. After the solution had been UV irradiated for 4 hours, the ratio had increased to 17. Since methyl group protons of the Si—CH₃ moieties are not affected, the increase in the ratio indicates that there has been a loss of Si—H groups during the reaction. We believe similar reactions occur with the Si—Si bonds, resulting in their loss, although we do not have similar proof.

We have also demonstrated that the incorporation reaction can be initiated by UV irradiation alone. Since a UV lamp also generates heat, the temperature of the reaction mixture generally rises to 60°-70° C. To confirm that we were seeing a photochemical and not just a thermal reaction, irradiations were carried out in a photochemical reactor that could be maintained at lower temperatures, −15° C. and −196° C. In both cases, the resultant polymers derived from the reaction with the standard 2 weight percent $Ru_3(CO)_{12}$ gave high (82 and 85%, respectively) yields of ceramic residue on pyrolysis to 1000° C. in a stream of argon. This indicates that a photochemical reaction alone is sufficient to cause the incorporation reaction.

Fibers can be drawn from a solution of the reactants, for example, a viscous, tacky syrup composed of the Nicalon polycarbosilane, 2 weight percent $Ru_3(CO)_{12}$ and a minimal amount of hexane. One batch of these fibers was irradiated with a UV lamp and then pyrolyzed to 1000° C. under argon. The other batch of fibers were pyrolyzed directly without prior UV irradiation. Black ceramic fibers were obtained in both cases. Since photochemical treatment would be difficult to effect in a fiber production line, it is significant that the thermal reaction in the presence of the organic solvent can result in the incorporation. Similarly, in industrial applications, the use of Fe instead of Ru as a metal would be typically preferred in view of its lower cost.

The invention is further illustrated by the examples that follow. However, these examples are only exemplary and not limited.

EXPERIMENTAL

A. General Procedure

All reactions were carried out under a nitrogen atmosphere, as were most other manipulations. Dried organic solvents were used. The Nicalon Polycarbosilane, a product of the Nippon Carbon Co., was purchased from Dow Corning, Inc. (Lot #X9-6348). The polymer (MW 1000-1500 by cryoscopy in benzene) was pulverized in an alumina mortar and pestle prior to use. Its pyrolysis to 950° C. in a stream of argon gave a ceramic residue (86% by weight SiC, 14% carbon) in 57% yield.

Metal complexes were purchased from Strem Chemicals, Inc., except for $Fe_3(CO)_{12}$, which was prepared by known literature methods. [Poly(methylhydrosiloxane), $[CH_3Si(H)O]_n$, was purchased from Petrarch (Catalog #PS-122).

The photochemical reactions were carried out in Pyrex glassware. unless it is specified that quartz glassware was used, using as UV source a Hanovia medium pressure mercury lamp (140 watts, $\lambda > 300$ nm) which was positioned about 7 cm from the reaction flask. The flask and lamp were covered with heavy duty aluminum foil to minimize outward emission of UV radiation. The heat of the UV lamp increased the temperature of the flask and contents to about 70° C., causing the solvent to reflux. Control experiments were carried out in a photochemical reactor that could be cooled to −196° C.: a small Dewar vessel (2.2 cm ID, 12.5 cm length) with a 5.2 cm quartz extension at the bottom. Experiments were carried out with cooling to −196° C. with liquid nitrogen or to −23° C. with a liquid nitrogen/$CCl_4$ slush bath. In the latter case, temperature control was in the region −15° C. to +10° C. due to the heat output of the UV lamp.

Ceramic samples for further study were obtained by pyrolysis of polymer samples in silica boats to 1000° C. or in carbon boats to 1500° C. in a stream of argon. The furnace tube was purged with argon (6–8 liters/hr) for 30 minutes prior to pyrolysis. The standard pyrolysis program involved heating at 10° C. per minute to 500° C., a hold at 500° C. for 30 minutes and then further heating at 5° C. per minute with a hold of 5 hours at the final temperature. Pyrolyses to 1000° C. were carried out in a Lindberg Model 59344 tube furnace with a 1.5" ID quartz tube; the sample was contained in a fused silica boat. Pyrolyses to 1200° C. or 1500° C. were carried out similarly using a Lindberg Model 59545 tube furnace equipped with a mullite tube and a silica or carbon boat supported on an alumina tube dee. Both furnaces were equipped with Eurotherm controllers.

EXAMPLE 1

This example illustrates the procedure used. It describes the photolysis of the Nicalon polycarbosilane (PCS) and 2 weight % $Ru_3(CO)_{12}$ in hexane.

The standard apparatus used in these experiments consists of an oven-dried 100 ml, three-necked, round-bottomed Pyrex flask equipped with two rubber septa, a reflux condenser, a 90° angle vacuum adapter and a magnetic stir-bar. The reaction apparatus was attached to the Schlenk manifold and purged with nitrogen and then was charged with 3.0 g of pulverized Nicalon PCS and 0.940 mmol (0.0601 g) of $Ru_3(CO)_{12}$ and outgassed for 20 minutes. Forty ml of degassed hexane was added to give a yellow solution. This solution was photolyzed as described in the "General Procedure" for 4 hours. Subsequently, the solution was evaporated at reduced pressure to leave an orange solid in quantitative yield. This solid was found to be soluble in all common organic solvents.

Anal. Found: 40.18% C, 7.97% H (vs. 39.43% C, 7.85% H for the Nicalon PCS). IR (in $CCl_4$, $cm^{-1}$): 2955m, 2900w, 2100vs, 2030vw, 2000vw, 1410w, 1355w, 1255vs, 1090w, 1020s, 870–840br, 690vw. $^1H$ NMR (250 MHz, $CDCl_3$): δ-1.0 to 0.8 (broad, 10H, SiCH) 3.9–4.5 (broad, 1H, SiH). $^{29}Si$ NMR (59.59 MHz, $CDCl_3$): $\delta_{Si}$-17.164 (broad). TGA (to 950° C. at 10° C./min. under Ar): black, infusible residue, 87.4% yield.

Bulk pyrolysis of this product (to 1000° C. under argon) gave a black solid residue in 76% yield.

Anal. Found: Si, 61.78%; C, 37.93%; H, 0.49%, allowing calculation of a formal composition of 1.0 SiC+0.44 C or 88.35% by weight of SiC and 11.65% C.

Pyrolysis to 1500° C. under argon gave a black solid residue.

Anal. Found: Si, 62.06%; 37.55% C, 0.03% H, equivalent formally to 1.0 SiC+0.42 C (or 88.82% by weight of SiC and 11.18% C). XRD (1500° C., material, d, Å): 2.5062, 1.5348, 1.3105, 2.6347, 0.8881 ($\beta$-SiC).

EXAMPLE 2

This experiment illustrates the use of $Ru_3(CO)_{12}$ in the amount of 11% by weight. The procedure is the same as above. A reaction was carried out using 0.2526 g of Nicalon PCS and 0.0280 g of $Ru_3(CO)_{12}$ in 40 ml of hexane. Photoylsis of the yellow solution for 4 hours followed. Evaporation of the dark red-brown solution that was formed under reduced pressure left 0.2831 g (quantitative yield) of a brown solid. The latter was very soluble in organic solvents. $^1H$ NMR (250 MHz, $CDCl_3$): δ-1.00 to 0.75 (broad, 10H, SiCH), 4.9 (broad, 1H, SiH). $^{29}Si$ NMR (59.59 MHz, $CDCl_3$): $\delta_{Si}$−18.78 and −17.73 (broad). TGA (to 950° C. at 10° C./min., under argon): black residue in 92.9% yield.

Further examples prepared as above are given in Table 5.

TABLE 5

| | | Reactions of Nicalon Polycarbosilane with Metal Carbonyls (Photochemical or Thermal Activation) | | | |
|---|---|---|---|---|---|
| Example No. | Nicalon PCS, g | Metal Carbonyl, g | Reaction Conditions | Product | Ceramic Yield in Product Pyrolysis[a] |
| 3 | 1.00 | $Ru_3(CO)_{12}$ (0.0208) | In hexane, reflux for 4 hr. | yellow-range solid | 82% |
| 4 | 1.00 | $Co_2(CO)_8$ (0.0205) | In hexane, UV for 4 hr. | light brown solid | 86% |
| 5 | 1.20 | $Co_2(CO)_8$ (0.035) | In hexane, UV for 4 hr. | light brown solid | 87% |
| 6 | 0.985 | $Co_2(CO)_8$ (0.010) | In hexane, reflux for 4 hr. | dark brown solid | 86% |
| 7 | 1.00 | $Co_4(CO)_{12}$ (0.0185) | In hexane, UV for 4 hr. | brown solid | 83% |
| 8 | 1.00 | $Co_4(CO)_{12}$ (0.0182) | In hexane, reflux for 4 hr. | brown solid | 82% |
| 9 | 0.503 | $Rh_6(CO)_{16}$ (0.0159) | In hexane, UV for 4 hr. | brown solid | 90% |
| 10 | 0.50 | $Rh_6(CO)_{16}$ (0.0155) | In hexane, reflux for 4 hr. | dark brown solid | 89% |
| 11 | 1.00 | $Fe(CO)_5$ (0.0059) | In hexane, UV for 4 hr. | yellow solid | 75% |

TABLE 5-continued

Reactions of Nicalon Polycarbosilane with Metal Carbonyls (Photochemical or Thermal Activation)

| Example No. | Nicalon PCS, g | Metal Carbonyl, g | Reaction Conditions | Product | Ceramic Yield in Product Pyrolysis[a] |
|---|---|---|---|---|---|
| 12 | 1.00 | $Fe(CO)_5$ (0.0059) | In hexane, reflux for 4 hr. | pale yellow solid | 65 |
| 13 | 1.00 | $Fe_3(CO)_{12}$ (0.015) | In hexane, UV for 4 hr. | yellow solid | 83% |
| 14 | 1.00 | $Fe_3(CO)_{12}$ (0.0156) | In hexane, reflux for 4 hr. | brown solid | 71% |
| 15 | 1.00 | $Os_3(CO)_{12}$ (0.0284) | In hexane, UV for 4 hr. | yellow solid | 87% |
| 16 | 1.00 | $Os_3(CO)_{12}$ (0.0275) | In hexane, reflux for 4 hr. | yellow solid | 63% |
| 17 | 1.00 | $Ir_4(CO)_{12}$ (0.0439) | In hexane, UV for 4 hr. | yellow solid | 67% |
| 18 | 1.00 | $Ir_4(CO)_{12}$ (0.0351) | In hexane, reflux for 4 hr. | cream-colored solid | 68% |

[a] by TGA; to 950° C. at 10° C./min. under argon.

Bulk Pyrolyses (to 1200° C. in a stream of argon).

EXAMPLE 4

| (Ceramic composition) | 83.1% SiC, 16.9% C | (by weight) |

EXAMPLE 5

86.8% SiC, 13.2% C

EXAMPLE 6

.86.5% SiC, 13.5% C

EXAMPLE 9

85.0% SiC, 15.0% C

EXAMPLE 13

86.5% SiC, 13.5% C

EXAMPLE 14

87.0% SiC, 13.0% C

EXAMPLE 17

88.8% SiC, 11.2% C

EXAMPLE 18

The standard apparatus was charged with 1.50 g of $[(CH_3SiH)_{0.65}(CH_3Si)_{0.35}]_x$ liquid polysilane, 0.0266 g of $Ru_3(CO)_{12}$ and 40 ml of hexane (all operations under nitrogen). Photolysis as in Example 1 for 4 hours, resulted in formation of a yellow-orange solution. Removal of solvent in vacuo left a dark-brown, glassy solid that was moderately soluble in common organic solvents (yield: 1.274 g).

$^1$H NMR (250 MHz, $CDCl_3$): δ-0.20 to 0.61 and 0.61 to 0.85 (broad resonances), 3.42-3.85 (broad, SiH). SiCH/SiH integrated ratio=6.1. TGA (to 950° C. at 10° C./min. under argon): black solid in 55% yield.

EXAMPLE 19

A similar experiment was carried out using 0.50 g of the $[(CH_3SiH)_{0.48}(CH_3Si)_{0.52}]_x$ solid polysilane and 0.011 g of $Ru_3(CO)_{12}$ in 40 ml of THF which gave a yellow-orange solid that was not soluble in common organic solvents. TGA (to 950° C. at 10° C./min. under argon): black solid in 74% yield.

EXAMPLE 20

This example illustrates the use of two organosilicon polymers in order to achieve the desired elemental composition.

The standard apparatus was charged (under nitrogen) with 2.03 g of the solid polysilane of Example 19, 1.00 g of pulverized Nicalon PCS (2:1 weight ratio), 0.0604 g of $Ru_3(CO)_{12}$ and 40 ml of dry, degassed THF. The resulting yellow solution was irradiated with the UV source for 4 hours. The solvent was removed at reduced pressure leaving an orange solid in quantitative yield.

$^1$H NMR (250 MHz, $CDCl_3$): δ-0.5 to 0.7 (broad, 16H, SiCH) and 3.5-3.9 (broad, 1H, SiH).

TGA (to 950° C. at 10° C./min. under argon): black solid residue, 74% yield.

Bulk pyrolysis to 1000° C. in a stream of argon left a ceramic residue whose elemental analysis allowed calculation of a formal composition of 99.7% by weight of SiC, 0.3% of free C.

Similar photolysis of a 5:1 by weight mixture of the solid polysilane and the Nicalon PCS in the presence of 2 wt. % of $Ru_3(CO)_{12}$ gave an insoluble product (ceramic yield by TGA:72%). Bulk pyrolysis of this material gave a residue of formal composition 95.3% by wt. SiC, 4.7% free Si.

EXAMPLE 21

Similar photochemical reaction of 2.01 g of the liquid polysilane of Example 18, 1.042 g of the Nicalon PCS and 0.0612 g of $Ru_3(CO)_{12}$ in 40 ml of hexane for 4 hours gave 3.06 g of a yellow solid which was moderately soluble in common organic solvents.

$^1$H NMR (250 MHz, $CDCl_3$): δ-0.08-0.94 (broad, 12H, SiCH) and 3.50-3.85 (broad, 1H, SiH).

TGA (to 950° C. at 10° C./min. under argon): black solid in 68% yield.

Bulk pyrolysis to 1000° C. in a stream of argon gave a solid residue whose analysis gave a formal composition of 99% SiC, 1% C, by weight.

A sample of this residue was heated under argon to 1200° C. XRD (d, Å): 2.5371, 1.5488, 1.3192, 0.9947, 0.9812, 0.8915 (β-SiC).

EXAMPLE 22

A similar experiment using a 3:1 by weight ratio of the liquid polysilane and the Nicalon PCS gave a yellow, tacky solid, TGA 67%. On bulk pyrolysis, as in Example 21, a material of formal composition 98% by weight SiC, 2% C was obtained.

EXAMPLE 23

The standard apparatus was charged with 0.0214 g of $Ru_3(CO)_{12}$, 1.117 g of the PS-122 $(CH_3(H)SiO)_x$ polyhydrosiloxane and 40 ml of dry, degassed hexane (under nitrogen) and the resulting solution was irradiated (UV source) for 4 hours. After removal of solvent at reduced pressure, a yellow oil remained. After storage under nitrogen for one day, the oil solidified to an insoluble gel. TGA (to 950° C., 10° C./min., under argon): 56%.

A similar experiment in which only 1 weight % of $Ru_3(CO)_{12}$ was used gave a yellow oil with similar properties. Its ceramic yield on pyrolysis (by TGA) was 46%. (vs. 0.34% when PS-122 was irradiated for 4 hours in benzene in the absence of a metal carbonyl in a control experiment).

EXAMPLE 24

An experiment carried out as that of Example 22 using the PS-122 polyhydrosiloxane and 2 weight % of $Fe(CO)_5$ (2 hours, followed by 2 days at room temperature) gave a black gel (TGA 68%) that was insoluble.

This invention has been described in detail with reference to the preferred embodiments thereof. However, it will be appreciated that those skilled in the art, upon consideration of this disclosure, may make modifications and improvements within the scope and spirit of the invention as described in the claims.

We claim:

1. An organosilicon-metal polymer prepared by a method comprising:
   (a) mixing a polycarbosilane polymer containing a multiplicity of Si—H functional groups with a sufficient quantity of a metal carbonyl for said metal carbonyl to be incorporated into the organosilicon polymer, wherein the metal is selected from the Group VIII metals; and
   (b) allowing the mixture of step (a) to react by initiating an incorporated reaction, thereby forming said organosilicon-metal polymer.

2. The organosilicon-metal polymer of claim 1 wherein the mixture is initiated by an incorporation reaction by the use of irradiation.

3. The organosilicon-metal polymer of claim 2 wherein the irradiation is UV irradiation.

4. The organosilicon-metal polymer of claim 1, wherein the polycarbosilane polymer having a plurality of Si—H functional groups is a polymer having a plurality of repeat units of the formula:

$[RSi(H)(A)_q]_n$;

where R is H, a substituted or unsubstituted lower alkyl group of 1 to about 6 carbon atoms, a substituted or unsubstituted cycloalkyl group of 3 to about 10 carbon atoms or a substituted or unsubstituted lower aryl group of 6 to about 10 carbon atoms, A is R, a difunctional alkylene, a difunctional alkenylene, a difunctional alkynylene or a heteroatom-substituted R, q is 1 or greater, and n is an integer greater than 1.

5. The organosilicon-metal polymer of claim 4 wherein the sufficient quantity of metal carbonyl used is at least about 0.25 weight percent.

6. The organosilicon-metal polymer of claim 1 wherein the sufficient quantity of metal carbonyl used is about 2 to 5 weight percent.

7. The organosilicon-metal polymer of claim 1 wherein the sufficient quantity of metal carbonyl used is 5% of weight percent or more.

8. The organosilicon-metal polymer of claim 4 wherein R is the lower alkyl group.

9. The organosilicon-metal polymer of claim 1, wherein the incorporation reaction is initiated by an energy input selected from the group consisting of heat and gamma irradiation.

10. The organosilicon-metal polymer of claim 4, wherein the polycarbosilane polymer is a polymer having a plurality of repeat units of the formula $[CH_3(H)SiCH_2]$.

11. The organosilicon-metal polymer of claim 1, wherein the metal is selected from the group consisting of Co, Fe, Ir, Os, Rh and Ru.

12. The organosilicon-metal polymer of claim 10, wherein the metal is selected from the group consisting of Co, Fe, Ir, Os, Rh and Ru.

* * * * *